(12) United States Patent
Tessien

(10) Patent No.: US 7,510,321 B2
(45) Date of Patent: *Mar. 31, 2009

(54) HYDRAULIC ACTUATED CAVITATION CHAMBER

(75) Inventor: Ross Alan Tessien, Grass Valley, CA (US)

(73) Assignee: Impulse Devices, Inc., Grass Valley, CA (US)

( * ) Notice: Subject to any disclaimer, the term of this patent is extended or adjusted under 35 U.S.C. 154(b) by 398 days.

This patent is subject to a terminal disclaimer.

(21) Appl. No.: 11/068,080

(22) Filed: Feb. 28, 2005

(65) Prior Publication Data

US 2009/0059718 A1    Mar. 5, 2009

(51) Int. Cl.
*B01F 11/00* (2006.01)

(52) U.S. Cl. .................. 366/114; 366/117; 366/124; 95/30; 95/248; 95/260; 95/266

(58) Field of Classification Search .............. 366/108, 366/114, 115, 124, 127, 273, 274, 293, 117; 95/30, 241, 260, 261, 266, 248

See application file for complete search history.

(56) References Cited

U.S. PATENT DOCUMENTS

| | | | | |
|---|---|---|---|---|
| 2,376,221 | A * | 5/1945 | Baker ....................... | 95/30 |
| 2,982,524 | A * | 5/1961 | Bland ...................... | 366/118 |
| 3,007,454 | A * | 11/1961 | Joelson .................... | 91/321 |
| 3,051,457 | A * | 8/1962 | Rice ........................ | 366/293 |
| 3,614,069 | A * | 10/1971 | Murry ..................... | 366/119 |
| 3,676,983 | A * | 7/1972 | Nold ....................... | 96/196 |
| 3,744,763 | A * | 7/1973 | Schnoring et al. ....... | 366/178.1 |
| 4,333,796 | A | 6/1982 | Flynn | |

(Continued)

FOREIGN PATENT DOCUMENTS

WO    PCT/US95/15972    7/1996

(Continued)

OTHER PUBLICATIONS

Blake et al, Acoustic Cavitation:The Fluid Dynamics of Non-Spherical Bubbles, Phil. Trans. R. Soc. Lond. A, 1999, pp. 251-267, vol. 357, Publisher: The Royal Society, Published in: Great Britain.

(Continued)

*Primary Examiner*—David L Sorkin
(74) *Attorney, Agent, or Firm*—C. Brandon Browning; Maynard Cooper & Gale, PC

(57) ABSTRACT

A cavitation system for forming and imploding cavities within a cavitation chamber is provided. The system includes a hydraulically actuated driver coupled to the cavitation chamber. A cavitation piston, coupled to a hydraulic piston, forms the desired cavities during piston retraction and then implodes the cavities during piston extension. Preferably the cavitation fluid is degassed prior to hydraulically driving cavitation within the chamber. Degassing can be performed within the cavitation chamber or within a separate degassing chamber which is preferably connected to the cavitation chamber. In one aspect, a coupling sleeve is interposed between the hydraulic driver and the cavitation chamber, the coupling sleeve housing at least a portion of the cavitation piston drive rod. Preferably the coupling sleeve can be evacuated. In another aspect, a cavitation fluid circulatory system is coupled to the cavitation chamber. In-line valves on the chamber inlets allow the chamber to be isolated from the circulatory system.

20 Claims, 3 Drawing Sheets

U.S. PATENT DOCUMENTS

| | | | |
|---|---|---|---|
| 4,563,341 A | | 1/1986 | Flynn |
| 5,176,446 A | * | 1/1993 | Chiba et al. ................. 366/114 |
| 5,658,534 A | | 8/1997 | Desborough et al. |
| 5,659,173 A | | 8/1997 | Putterman et al. |
| 5,858,104 A | | 1/1999 | Clark |
| 5,994,818 A | | 11/1999 | Abramov et al. |
| 6,095,677 A | * | 8/2000 | Karkos et al. ................ 366/274 |
| 6,386,751 B1 | * | 5/2002 | Wootan et al. ............ 366/170.3 |
| 6,627,784 B2 | * | 9/2003 | Hudson et al. .............. 588/320 |
| 2002/0090047 A1 | | 7/2002 | Stringham |
| 2003/0044442 A1 | * | 3/2003 | Stanier et al. ................ 424/401 |
| 2004/0191707 A1 | * | 9/2004 | Mitsui et al. ................. 430/567 |

FOREIGN PATENT DOCUMENTS

| | | |
|---|---|---|
| WO | WO 0139199 A2 * | 5/2001 |
| WO | PCT/US02/16761 | 12/2002 |
| WO | PCT/CA03/00342 | 9/2003 |

OTHER PUBLICATIONS

M. Dan et al., Ambient Pressure Effect on Single-Bubble Sonoluminescence, Physical Review Letters, Aug. 30, 1999, pp. 1870-1873, vol. 83, No. 9, Publisher: The American Physical Society, Published in: US.

Moss et al., Computed Optical Emissions from a Sonoluminescing Bubble, Physical Review E, Mar. 1999, pp. 2986-2992, vol. 59, No. 3, Published in: US.

Gaitan et al, Experimental Observations of Bubble Response and Light Intensity Near the Threshold for Single Bubble Sonoluminescence, Physical Review E, May, 1999, pp. 5495-5502, vol. 59, No. 5, Published in: US.

Barber et al, Sensitivity of Sonoluminescence to Experimental Parameters, Physical Review Letters, Feb. 28, 1994, pp. 1380-1382, vol. 72, No. 9.

Putterman, Sonoluminescence:Sound Into Light, Scientific American, Feb. 1995, pp. 46-51.

Gaitan et al, Sonoluminescence and Bubble Dynamics for a Single, Stable, Cavitation Bubble, J. Acoust. Soc. Am., Jun. 1992, pp. 3166-3183, vol. 91, No. 6, Publisher: Acoustical Society of America.

Crum, Sonoluminescence, Physics Today, Sep. 1994, pp. 22-29, Publisher: American Institute of Physics, Published in: US.

A Chakravarty et al., Stable Sonoluminescence Within a Water Hammer Tube, Physical Review E, Jun. 24, 2004, pp. 1-8, vol. 69, No. 066317, Publisher: The American Physical Society, Published in: US.

Bollinger, Ultra Cavitation, http://wiretap.area.com/Gopher/Library/Article/Sci/cavitate.ult, Sep. 17, 2001, pp. 1-26.

* cited by examiner

HYDRAULIC ACTUATED CAVITATION CHAMBER

FIELD OF THE INVENTION

The present invention relates generally to cavitation systems and, more particularly, to a hydraulic system for cavitating bubbles within a cavitation chamber.

BACKGROUND OF THE INVENTION

Sonoluminescence is a well-known phenomena discovered in the 1930's in which light is generated when a liquid is cavitated. Although a variety of techniques for cavitating the liquid are known (e.g., spark discharge, laser pulse, flowing the liquid through a Venturi tube), one of the most common techniques is through the application of high intensity sound waves.

In essence, the cavitation process consists of three stages; bubble formation, growth and subsequent collapse. The bubble or bubbles cavitated during this process absorb the applied energy, for example sound energy, and then release the energy in the form of light emission during an extremely brief period of time. The intensity of the generated light depends on a variety of factors including the physical properties of the liquid (e.g., density, surface tension, vapor pressure, chemical structure, temperature, hydrostatic pressure, etc.) and the applied energy (e.g., sound wave amplitude, sound wave frequency, etc.).

Although it is generally recognized that during the collapse of a cavitating bubble extremely high temperature plasmas are developed, leading to the observed sonoluminescence effect, many aspects of the phenomena have not yet been characterized. As such, the phenomena is at the heart of a considerable amount of research as scientists attempt to further characterize the phenomena (e.g., effects of pressure on the cavitating medium) as well as its many applications (e.g., sonochemistry, chemical detoxification, ultrasonic cleaning, etc.).

Acoustic drivers are commonly used to drive the cavitation process. For example, in an article entitled *Ambient Pressure Effect on Single-Bubble Sonoluminescence* by Dan et al. published in vol. 83, no. 9 of Physical Review Letters, the authors use a piezoelectric transducer to drive cavitation at the fundamental frequency of the cavitation chamber. They used this apparatus to study the effects of ambient pressure on bubble dynamics and single bubble sonoluminescence.

U.S. Pat. No. 4,333,796 discloses a cavitation chamber that is generally cylindrical although the inventors note that other shapes, such as spherical, can also be used. It is further disclosed that the chamber is comprised of a refractory metal such as tungsten, titanium, molybdenum, rhenium or some alloy thereof and the cavitation medium is a liquid metal such as lithium or an alloy thereof. Surrounding the cavitation chamber is a housing which is purportedly used as a neutron and tritium shield. Projecting through both the outer housing and the cavitation chamber walls are a number of acoustic horns, each of the acoustic horns being coupled to a transducer which supplies the mechanical energy to the associated horn.

U.S. Pat. No. 5,658,534 discloses a sonochemical apparatus consisting of a stainless steel tube about which ultrasonic transducers are affixed. The patent provides considerable detail as to the method of coupling the transducers to the tube. In particular, the patent discloses a transducer fixed to a cylindrical half-wavelength coupler by a stud, the coupler being clamped within a stainless steel collar welded to the outside of the sonochemical tube. The collars allow circulation of oil through the collar and an external heat exchanger. The abutting faces of the coupler and the transducer assembly are smooth and flat. The energy produced by the transducer passes through the coupler into the oil and then from the oil into the wall of the sonochemical tube.

U.S. Pat. No. 5,858,104 discloses a shock wave chamber partially filled with a liquid. The remaining portion of the chamber is filled with gas which can be pressurized by a connected pressure source. Acoustic transducers mounted in the sidewalls of the chamber are used to position an object within the chamber while another transducer delivers a compressional acoustic shock wave into the liquid. A flexible membrane separating the liquid from the gas reflects the compressional shock wave as a dilatation wave focused on the location of the object about which a bubble is formed.

U.S. Pat. No. 5,994,818 discloses a transducer assembly for use with tubular resonator cavity rather than a cavitation chamber. The assembly includes a piezoelectric transducer coupled to a cylindrical shaped transducer block. The transducer block is coupled via a central threaded bolt to a wave guide which, in turn, is coupled to the tubular resonator cavity. The transducer, transducer block, wave guide and resonator cavity are co-axial along a common central longitudinal axis. The outer surface of the end of the wave guide and the inner surface of the end of the resonator cavity are each threaded, thus allowing the wave guide to be threadably and rigidly coupled to the resonator cavity.

PCT Application No. US02/16761 discloses a nuclear fusion reactor in which at least a portion of the liquid within the reactor is placed into a state of tension, this state of tension being less than the cavitation threshold of the liquid. In at least one disclosed embodiment, acoustic waves are used to pre-tension the liquid. After the desired state of tension is obtained, a cavitation initiation source, such as a neutron source, nucleates at least one bubble within the liquid, the bubble having a radius greater than a critical bubble radius. The nucleated bubbles are then imploded, the temperature generated by the implosion being sufficient to induce a nuclear fusion reaction.

PCT Application No. CA03/00342 discloses a nuclear fusion reactor in which a bubble of fusionable material is compressed using an acoustic pulse, the compression of the bubble providing the necessary energy to induce nuclear fusion. The nuclear fusion reactor is spherically shaped and filled with a liquid such as molten lithium or molten sodium. A pressure control system is used to maintain the liquid at the desired operating pressure. To form the desired acoustic pulse, a pneumatic-mechanical system is used in which a plurality of pistons associated with a plurality of air guns strike the outer surface of the reactor with sufficient force to form a shock wave within the liquid in the reactor. The application discloses releasing the bubble at the bottom of the chamber and applying the acoustic pulse as the bubble passes through the center of the reactor. A number of methods of determining when the bubble is approximately located at the center of the reactor are disclosed.

Avik Chakravarty et al., in a paper entitled *Stable Sonoluminescence Within a Water Hammer Tube* (Phys Rev E 69 (066317), Jun. 24, 2004), investigated the sonoluminescence effect using a water hammer tube rather than an acoustic resonator, thus allowing bubbles of greater size to be studied. The experimental apparatus employed by the authors included a sealed water hammer tube partially filled with the liquid under investigation. The water hammer tube was mounted vertically to the shaft of a moving coil vibrator. Cavitation was monitored both with a microphone and a photomultiplier tube.

Although a variety of cavitation systems have been designed, typically these systems operate at relatively low pressure and utilize acoustic drivers to cavitate extremely small bubbles. As a result, the amount of energy that can be concentrated during the process is limited. The present invention overcomes these limitations by providing a system that operates at high pressures and that can be used to form and cavitate very large bubbles.

SUMMARY OF THE INVENTION

The present invention provides a cavitation system for forming and imploding cavities within a cavitation chamber. The system includes a hydraulically actuated driver coupled to the cavitation chamber. A cavitation piston, coupled to a hydraulic piston, forms the desired cavities during piston retraction and then implodes the cavities during piston extension. In addition to a hydraulic pump and hydraulic fluid reservoir, one embodiment of the invention includes an accumulator, thereby providing a means for rapidly cycling the hydraulic driver and increasing the implosion intensity. Preferably the cavitation fluid is degassed prior to hydraulically driving cavitation within the chamber. Degassing can be performed within the cavitation chamber or within a separate degassing chamber which is preferably connected to the cavitation chamber.

In at least one embodiment of the invention, a coupling sleeve is interposed between the hydraulic driver and the cavitation chamber. The rod which links the cavitation piston to the hydraulic piston is housed, at least in part, within the coupling sleeve. The coupling sleeve helps to prevent cross-contamination of the cavitation fluid and the hydraulic fluid. Additionally, by evacuating the coupling sleeve, a potential source for cavitation chamber gas leaks is minimized, if not altogether eliminated.

In at least one embodiment of the invention, a cavitation fluid circulatory system is coupled to the cavitation chamber, preferably via a pair of inlets. In-line valves on the chamber inlets allow the chamber to be isolated, when desired, from the circulatory system.

A further understanding of the nature and advantages of the present invention may be realized by reference to the remaining portions of the specification and the drawings.

DESCRIPTION OF THE SPECIFIC EMBODIMENTS

System Overview

Figure 1:
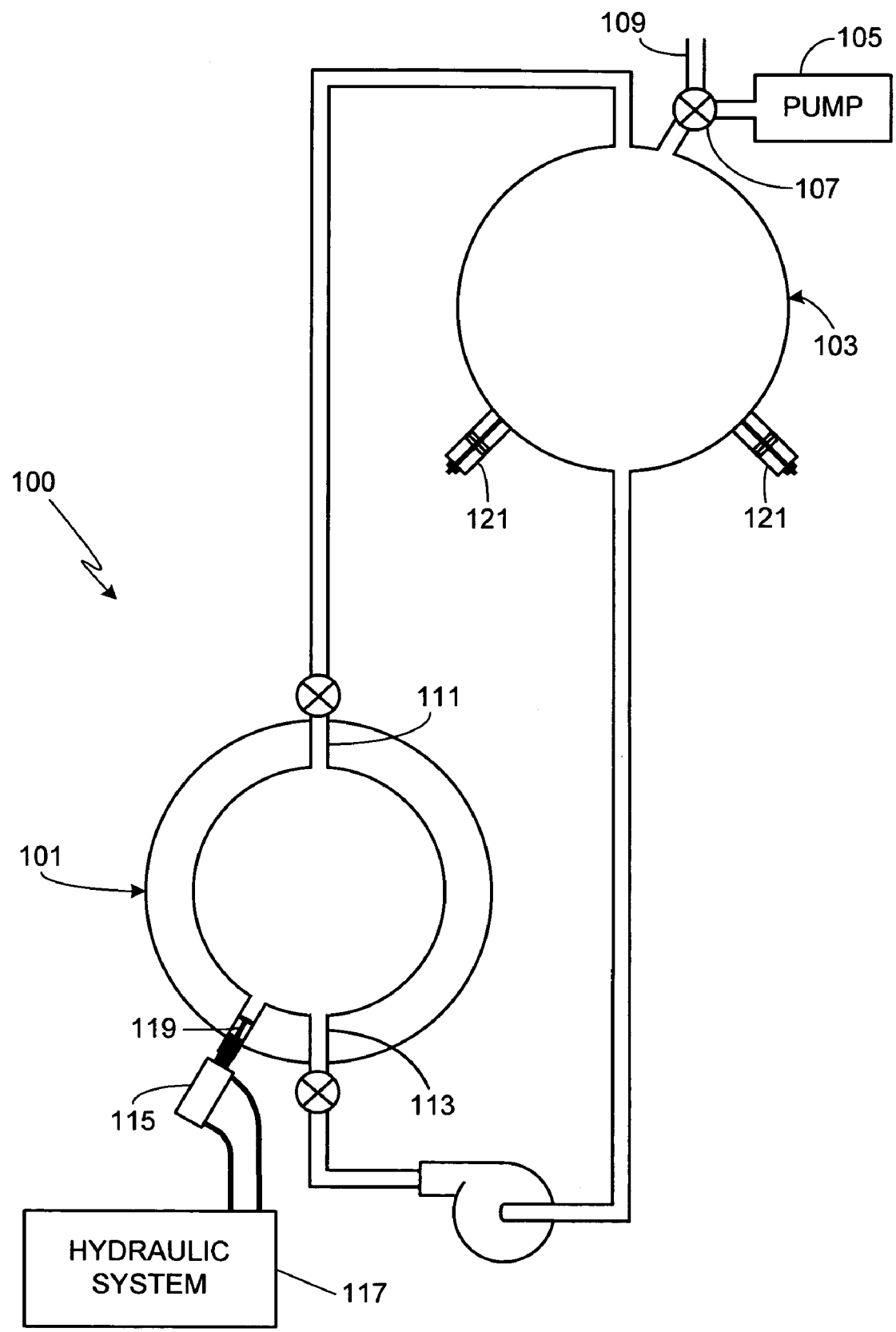
FIG. 1 is a conceptual illustration of the principal elements of the invention implemented in an exemplary embodiment.

FIG. 1 is a conceptual illustration of the principal elements of the invention implemented in an exemplary embodiment. The principal component of system 100 is the cavitation chamber 101. Although as illustrated cavitation chamber 101 is spherical, it will be appreciated that the invention is not so limited and that cavitation chambers of other configurations (e.g., cylindrical, conical, cubical, rectangular, etc.) can also be used with the present invention. Chamber 101 must be fabricated to withstand high operating pressures, preferably pressures of at least 1,000 PSI, more preferably pressures of at least 10,000 PSI, and still more preferably pressures of at least 100,000 PSI. Additionally, chamber 101 should be designed to properly seal when evacuated, thus allowing degassing procedures to be performed in situ. One method of fabricating chamber 101 is described in detail in co-pending U.S. patent application Ser. No. 10/925,070, filed Aug. 23, 2004, entitled Method of Fabricating a Spherical Cavitation Chamber, the entire disclosure of which is incorporated herein for any and all purposes. Alternately, for example, the chamber can be fabricated from multiple pieces (e.g., two sections) that are bolted together with a plurality of bolts. One or more seals (e.g., o-rings, gaskets, etc.) seal the portions together, thus allowing the chamber to operate at the desired pressures.

Chamber 101 can be fabricated from any of a variety of materials although there are some constraints placed on the chamber material. First, the material is preferably machinable, thus simplifying the fabrication process. Second, the material should be conducive to high pressure operation. Third, if the chamber is to be operated at a high temperature, the chamber material should have a relatively high melting temperature. Additionally, depending upon the process used to assemble individual chamber pieces together (e.g., brazing), a high melting temperature may be desirable as an aid to fabrication and assembly. Fourth, the chamber material should be corrosion resistant, thus allowing the chamber to be used repeatedly and with a variety of liquids. Fifth, the material should be hard enough to allow a good surface finish to be obtained. In one preferred embodiment of the invention, the chamber is fabricated from 17-4 precipitation hardened stainless steel.

With respect to the dimensions of the chamber, both inner and outer dimensions, the selected sizes depend upon the intended use of the chamber. For example, smaller chambers are typically preferable for situations in which it is desirable to limit the amount of cavitating medium, for example due to the cost of the medium, or when extremely high peak pressures are desired. On the other hand large chambers, with inside dimensions on the order of 8-10 inches or greater, simplify experimental set-up and event observation, and allow for implosion of larger cavities. Thick chamber walls are preferable, both due to the high operating pressures encountered during chamber operation and as a means of simplifying the coupling of the hydraulic driver to the chamber as described in detail below.

As described more fully below, the cavitation medium is degassed prior to the use of the hydraulic driver of the invention. Degassing the cavitation fluid is crucial in order for the collapsing bubbles within the cavitation chamber to achieve the desired high velocities, and thus high temperatures and pressures at implosion stagnation. Although the cavitation medium can be degassed prior to filling the chamber, preferably the chamber is coupled to a circulatory system in which there is a degassing station. For example, the system shown in FIG. 1 includes a degassing chamber 103 which is coupled to a vacuum pump 105 via a three-way valve 107, valve 107 allowing chamber 103 to be coupled either to pump 105 (e.g., for degassing purposes) or open to the atmosphere via conduit 109. Degassing chamber 103 is coupled to cavitation chamber 101 via cavitation chamber inlets 111 and 113. Inlets 111 and 113 are preferably located at the top and bottom portions, respectively, of chamber 101, and more preferably located at the uppermost and lowermost portions of chamber 101, thereby preventing bubbles from being trapped within chamber 101.

Although there are a variety of ways in which the degassing system can be coupled to chamber 101, it will be appreciated that the invention is not limited to a particular configuration. For example, degassing chamber 103 need not be coupled to chamber 101 via a pair of inlets. Rather, chamber 103 can be coupled via a single inlet, allowing the cavitation fluid to be degassed and used to fill cavitation chamber 101. The degassing chamber 103 can also be coupled to the cavitation chamber 101 using a circulatory system that not only simplifies degassing, but also cavitation chamber filling and draining. Other components that may or may not be coupled to the circulatory system include bubble traps, cavitation fluid filters, and heat exchange systems. Further description of some of these variations are provided in co-pending U.S. patent application Ser. Nos. 10/961,353, filed Oct. 7, 2004, and 11/001,720, filed Dec. 1, 2004, the disclosures of which are incorporated herein for any and all purposes.

Attached to chamber 101 is at least one hydraulic driver 115 that is coupled to a hydraulic system 117. Hydraulic driver 115 includes a piston 119. As hydraulic driver 115, and thus piston 119, is withdrawn, a cavity is formed within the cavitation medium contained in chamber 101. After the cavity is formed, driver 115 and thus piston 119 are extended, compressing the cavity and causing the desired cavity implosion.

Cavitation Fluid Preparation

In order to achieve high intensity cavity implosions, the cavitation medium must first be degassed. It should be understood that the present invention is not limited to a particular degassing technique, and the techniques described herein are for illustrative purposes only.

The first step in the degassing method is to fill the degassing reservoir with cavitation fluid. Although in the illustrated embodiment a separate degassing chamber 103 coupled via a circulatory system is included, degassing can be performed in a separate, non-coupled chamber, or within cavitation chamber 101. In the illustrated example, the fluid within the reservoir is then degassed using vacuum pump 105. The amount of time required during this step depends on the volume of cavitation chamber 101, the volume of cavitation fluid to be degassed and the capabilities of the vacuum system. Preferably vacuum pump 105 evacuates reservoir 103 until the pressure within the reservoir is close to the vapor pressure of the cavitation fluid, for example to a pressure of within 0.2 psi of the vapor pressure of the cavitation fluid or more preferably to a pressure of within 0.02 psi of the vapor pressure of the cavitation fluid. Typically this step of the degassing procedure is performed for at least 1 hour, preferably for at least 2 hours, more preferably for at least 4 hours, and still more preferably until the reservoir pressure is as close to the vapor pressure of the cavitation fluid as previously noted.

Once the fluid within reservoir 103 is sufficiently degassed using vacuum pump 105, preferably further degassing is performed by cavitating the fluid, the cavitation process tearing vacuum cavities within the cavitation fluid. As the newly formed cavities expand, gas from the fluid that remains after the initial degassing step enters into the cavities. During cavity collapse, however, not all of the gas re-enters the fluid. Accordingly a result of the cavitation process is the removal of dissolved gas from the cavitation fluid via rectified diffusion and the generation of bubbles.

Cavitation as a means of degassing the fluid can be performed within cavitation chamber 101, degassing chamber 103, or a separate cavitation/degassing chamber (not shown). Furthermore, any of a variety of techniques can be used to cavitate the fluid. In the preferred embodiment of the invention, one or more acoustic drivers 121 are coupled to degassing chamber 103 and/or the hydraulic chamber 101 (not shown). Acoustic drivers can be fabricated and mounted, for example, in accordance with co-pending U.S. patent application Ser. No. 10/931,918, filed Sep. 1, 2004, the disclosure of which is incorporated herein for any and all purposes. The operating frequency of drivers 121 depends on a variety of factors such as the sound speed of the liquid within the chamber, the shape/geometry of the chamber, the sound field geometry of the drivers, etc. In at least one embodiment the operating frequency is within the range of 1 kHz to 10 MHz. The selected frequency can be the resonant frequency of the chamber, an integer multiple of the resonant frequency, a non-integer multiple of the resonant frequency, or periodically altered during operation.

For high vapor pressure liquids, preferably prior to the above-identified cavitation step the use of the vacuum pump (e.g., pump 105) is temporarily discontinued. Next the fluid within chamber 103 is cavitated for a period of time, typically for at least 5 minutes and preferably for more than 30 minutes. The bubbles created during this step float to the top of chamber 103 due to their buoyancy. The gas removed from the fluid during this step is periodically removed from the reactor system, as desired, using vacuum pump 105. Typically vacuum pump 105 is only used after there has been a noticeable increase in pressure within chamber 103, preferably an increase of at least 0.2 psi over the vapor pressure of the cavitation fluid, alternately an increase of at least 0.02 psi over the vapor pressure of the cavitation fluid, or alternately an increase of a couple of percent of the vapor pressure. Preferably the use of cavitation as a means of degassing the cavitation fluid is continued until the amount of dissolved gas within the cavitation fluid is so low that the fluid will no longer cavitate at the same cavitation driver power. Typically these cavitation/degassing steps are performed for at least 12 hours, preferably for at least 24 hours, more preferably for at least 36 hours, and still more preferably for at least 48 hours.

The above degassing procedure is sufficient for most applications, however in an alternate embodiment of the invention another stage of degassing is performed prior to cavitating the fluid using the hydraulic actuated driver. The first step of this additional degassing stage is to form cavities within the cavitation fluid contained in the degassing chamber. These cavities can be formed using any of a variety of means, including neutron bombardment, focusing a laser beam into the cavitation fluid to vaporize small amounts of fluid, by locally heating small regions with a hot wire, or by other means. Once one or more cavities are formed within the cavitation fluid, acoustic drivers 121 cause the cavitation of the newly formed cavities, resulting in the removal of additional dissolved gas within the fluid and the formation of bubbles. The bubbles, due to their buoyancy, drift to the top of the chamber where the gas can be removed, when desired, using vacuum pump 105. This stage of degassing can continue for either a preset time period (e.g., greater than 6 hours and preferably greater than 12 hours), or until the amount of dissolved gas being removed is negligible as evidenced by the pressure within the chamber remaining stable at the vapor pressure of the cavitation fluid for a preset time period (e.g., greater than 10 minutes, or greater than 30 minutes, or greater than 1 hour, etc.).

Cavitation Chambers

Figure 2:
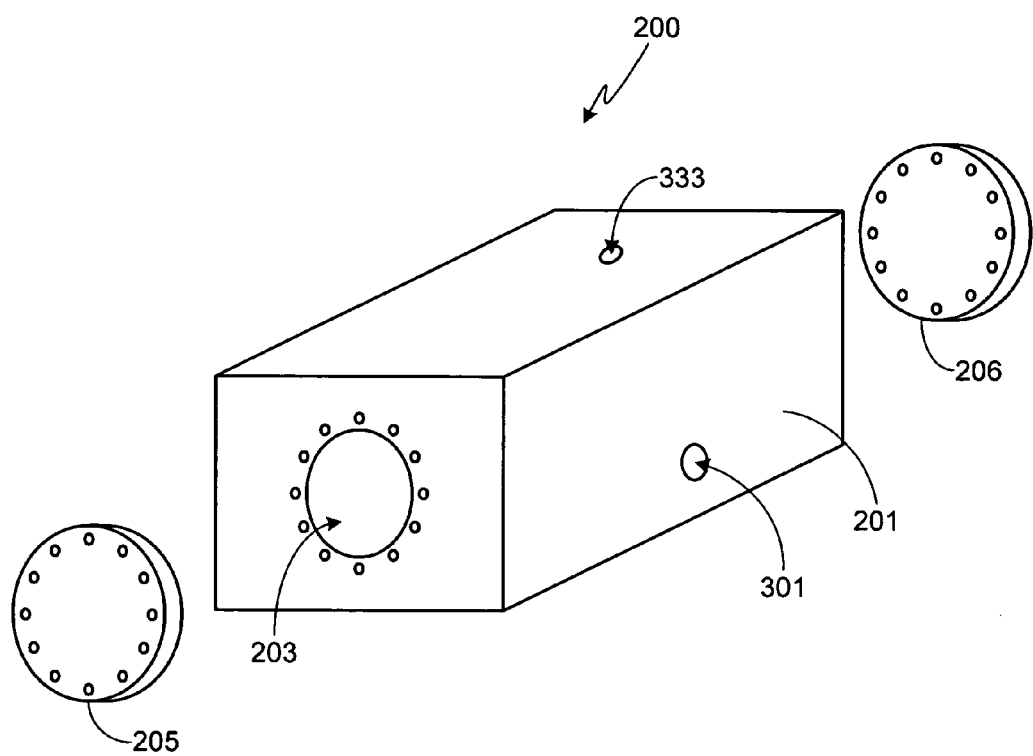
FIG. 2 is a perspective view of the external body portion of a cylindrical cavitation chamber for use with the invention.
Figure 3:
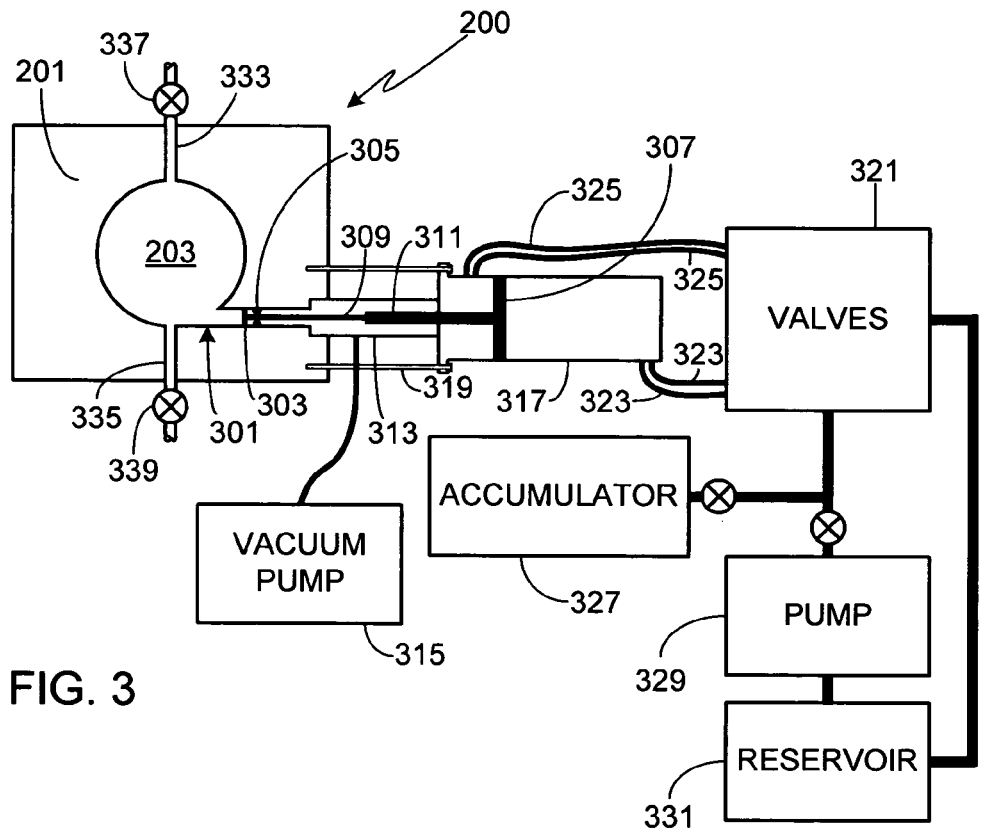
FIG. 3 is a cross-sectional view of the cavitation chamber shown in FIG. 2 coupled to the hydraulic driver.

FIGS. 2-3 illustrate a preferred embodiment of a cavitation chamber 200 in accordance with the invention. Chamber 200 can be coupled to a degassing system as shown in FIG. 1, or an alternate system as previously noted. To simplify fabrication, preferably chamber 200 is fabricated from a single block of material 201, for example stainless steel. A cylindrical hole 203 is bored into block 201, hole 203 making up the interior portion of the cavitation chamber. A pair of end caps 205/206 seal chamber 200, the end caps preferably bolted to block 2001 with a plurality of bolts and sealed with one or more sealing members (e.g., o-rings, gaskets, etc.). In this embodiment of the invention, the cylindrical cavitation chamber 200 is 6 inches long with an inside diameter (ID) of 3 inches.

In the illustrated embodiment and as shown in the cross-sectional view of FIG. 3, a hole 301 is bored into the side of chamber wall 201 such that it intersects a lower portion of the cavitation chamber. Although this configuration is preferred, it should be understood that the hydraulic driver does not have to be coupled at a specific angle or at a specific location relative to the cavitation chamber in order to drive cavitation within the chamber.

Within hole 301 is cavitation drive piston 303, piston 303 having an outside diameter (OD) of 0.690 inches in this embodiment. One or more seals 305 prevent leakage of the cavitation medium around piston 303 throughout the piston stroke. In the preferred embodiment, cavitation drive piston 303 is coupled to a hydraulically actuated piston 307 via a two-part piston rod, i.e., rod portions 309 and 311. The two-part piston rod design simplifies assembly/disassembly as well as system maintenance. Furthermore, in terms of research and development devices, this design allows a single hydraulic piston to be easily coupled to any of a variety of cavitation chambers and cavitation pistons, thus providing system flexibility at minimal cost. Lastly, this arrangement provides a simple method of altering the pressure applied by piston 303 to the cavitation medium. Specifically, since the peak applied pressure is directly proportional to the effective area of the piston, pressure changes can be made by altering the ratio of the areas of hydraulic piston 307 and cavitation drive piston 303.

Due to the need to accommodate piston 303 from full extension to full retraction, i.e., the piston stroke, either the wall thickness of chamber housing 201 must be appropriately sized or an additional sleeve (i.e., a spacer) must be added to accommodate the piston stroke. In the illustrated embodiment, with a piston stroke of 3 inches, a coupling sleeve 313 is introduced between housing 201 and hydraulic cylinder 311. In addition to being more economical than sizing chamber 201 to accommodate the entire piston stroke, coupling sleeve 313 provides further separation between the hydraulic liquid driving the hydraulic piston (e.g., piston 307) and the cavitation fluid within the chamber, thus helping to prevent contamination of either fluid by the other fluid due to a faulty seal. Preferably coupling sleeve is coupled to a vacuum pump 315, thus allowing the sleeve to be evacuated. The inventor has found that by evacuating sleeve 313 air leakage into chamber 200 is reduced, air leakage leading to a weakening of the desired cavitation implosions.

Although not required, in the preferred embodiment coupling sleeve 313 is counter-bored into housing 201 and subsequently welded in place. Alternate methods of coupling sleeve 313 to housing 201 include bolts, a threaded hole/collar arrangement, brazing, bonding, etc. Hydraulic cylinder housing 317 is threadably coupled to sleeve 313 and held in place via a plurality of bolts 319. A suitable hydraulic cylinder 317 is manufactured by Ortman, for example Ortman 3T-NQ with a 2.5 inch bore, 3 inch stroke and 0.625 inch piston rod.

Hydraulic cylinder 317 is coupled to a valve 321 (e.g., Continental high flow solenoid operated valves) by hydraulic lines 323/325. Valve 321 applies forward pressure to piston 307 through hydraulic lines 323, thus causing piston 307 and coupled piston 303 to become extended. Retraction of piston 307 and coupled piston 303 is caused by valve 321 applying backward pressure via hydraulic lines 325. Although a single hydraulic line 323 and a single hydraulic line 325 can be used to extend and retract piston 307, utilizing multiple lines 323/325 allow for more rapid extension/retraction of the pistons. Rapid extension of the pistons is further aided by the use of a nitrogen loaded, bladder type accumulator 327. Valve 321 is also coupled to a hydraulic pump 329 (e.g., Bosch vane type pump) and a reservoir 331.

Figure 4:
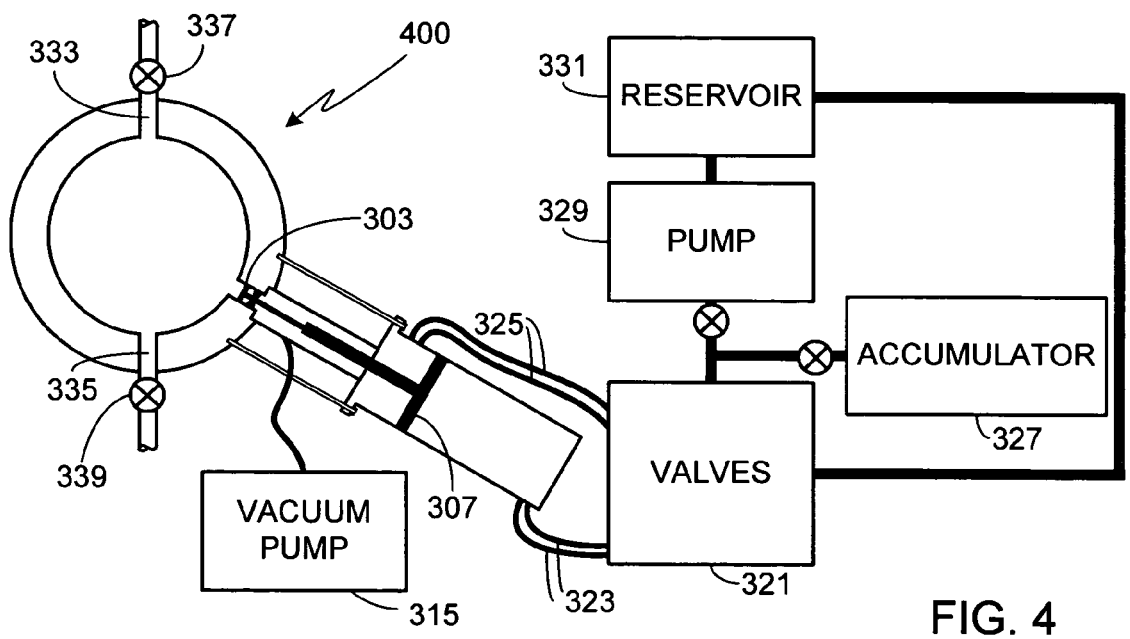
FIG. 4 is a cross-sectional view of a spherical cavitation chamber for use with the invention.

FIG. 4 is a cross-sectional view of an alternate cavitation chamber. The degassing aspects as well as the hydraulic cavitation driver are the same as previously described relative to chamber 200. In this embodiment, however, cylindrical chamber 200 is replaced with a spherical chamber 400. Spherical chamber 400 can be fabricated as described in co-pending U.S. patent application Ser. No. 10/925,070, filed Aug. 23, 2004, the disclosure of which is incorporated herein for any and all purposes. Alternately, spherical chamber 400 can be fabricated from multiple portions bolted together, or otherwise joined, and sealed with one or more seals (e.g., o-rings, gaskets, etc.). Operation of chamber 400 is the same as described relative to chamber 200.

Hydraulic Driver Methodology

In a preferred approach, prior to cavitation and after the cavitation fluid has been degassed as previously noted, hydraulic piston 307 and coupled cavitation piston 303 are partially withdrawn from the completely extended position. The amount of piston withdrawal depends, in part, on the compressibility of the cavitation medium. For example, a cavitation fluid comprised of a very non-compressible liquid (e.g., liquid metal) typically requires much less pre-cavitation piston withdrawal than a more compressible liquid (e.g., acetone). For a compressible liquid such as acetone, a pre-cavitation piston withdrawal of approximately 25 percent is preferred.

The next step is to isolate the cavitation chamber from any degassing systems and/or a cavitation fluid circulatory systems to which it is coupled. For example, assuming chamber 200 includes a pair of inlets 333/335 in order to couple the chamber to a cavitation fluid circulatory and degassing system as shown in FIG. 1, a pair of shut-off valves 337/339 provide the necessary means of isolating the chamber. Chamber 200 must be isolated prior to operation to insure that the desired operating pressures can be reached.

After chamber isolation, hydraulic piston 307 and coupled cavitation piston 303 are withdrawn, causing a cavity (e.g., a bubble) to be formed within the degassed cavitation fluid. The hydraulic piston 307 and coupled cavitation piston 303 are then rapidly extended to the fullest possible extent as limited either by mechanical piston stops or by the resultant back pressure. During piston extension, the previously created cavity or cavities are compressed, causing cavity implosion. Subsequent cavitation cycles only require cycling cavitation piston 303, i.e., it is unnecessary to open the chamber, partially withdraw the piston, isolate the chamber and cycle the piston. Although the system can be used for single cavitation cycles, preferably multiple cycles are performed, thus generating high chamber pressures and extremely energetic implosions. The maximum cycle rate depends on the speed of the solenoid valves, the compressibility of the cavitation fluid, the pressure applied by the cavitation piston, the size of the chamber, the number of hydraulic lines coupling valves 321 to cylinder 317 and the size of accumulator 315. In the preferred embodiment, pistons 307/303 are fully extended at a rate of approximately 0.1 seconds per stroke. The system can be cycled, i.e., piston retracted and then extended, at a rate of up to 20 cycles per second.

In an alternate preferred approach, prior to cavitation and after the cavitation fluid has been degassed, hydraulic piston 307 and coupled cavitation piston 303 are completely withdrawn. During this step the cavitation chamber can either be open to, or isolated from, any coupled degassing and/or cavitation fluid circulatory systems. After pistons 307/303 are completely withdrawn, the cavitation chamber inlets (e.g., inlets 333/335 controlled via valves 337/339) are opened if previously closed, or left open if previously open.

The next step is to isolate the cavitation chamber from any coupled degassing and/or cavitation fluid circulatory systems, for example by closing any inlet valves (e.g., valves 337/339 in FIG. 3). Once the chamber is isolated, hydraulic piston 307 and coupled cavitation piston 303 are fully extended. As a result of the extension of pistons 307/303, the cavitation fluid is compressed and the internal pressure of the cavitation chamber is increased.

After chamber isolation and cavitation fluid compression, the cavitation chamber is partially opened to the degassing system and/or cavitation fluid circulatory system to which it is coupled. Preferably this step is performed by opening a valve located near the top of cavitation chamber 101, and more preferably at the uppermost portion of the cavitation chamber (e.g., valve 337). The valve is only opened by a small degree and for a short period of time; just sufficient to change the internal cavitation chamber pressure by a predetermined amount. The amount that the pressure is allowed to change governs the size of the cavity that will be cavitated during the cavitation process, i.e., greater pressure changes result in larger cavities. It will be appreciated that the invention does not require a specific cavity size, rather the size to be cavitated is dictated by the type of desired reaction and thus the intended reactants and the desired temperature and pressure. Other factors which determine the desired pressure change include cavitation fluid compressibility, cavitation chamber size, hydraulic driver capabilities, cavitation piston effective area, and the degree to which the cavitation fluid has been degassed during the prior degassing steps.

Once the pressure has been allowed to change by the predetermined amount, the cavitation chamber is once again isolated from the degassing and/or cavitation fluid circulatory systems. After chamber isolation, hydraulic piston 307 and coupled cavitation piston 303 are withdrawn, causing a cavity (e.g., a bubble) to be formed within the degassed cavitation fluid. The hydraulic piston 307 and coupled cavitation piston 303 are then rapidly extended to the fullest possible extent as limited either by mechanical piston stops or by the resultant back pressure. During piston extension, the previously created cavity or cavities are compressed, causing cavity implosion. Subsequent cavitation cycles only require cycling cavitation piston 303, i.e., it is unnecessary to open/close the cavitation chamber and adjust the internal chamber pressure. As in the previous method, the system can be used either for single cavitation cycles or multiple cavitation cycles, the maximum cycle rate depending on the speed of the solenoid valves, the compressibility of the cavitation fluid, the pressure applied by the cavitation piston, the size of the chamber, the number of hydraulic lines coupling valves 321 to cylinder 317 and the size of accumulator 315.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A cavitation system comprising:
a circulatory system for circulating cavitation fluid through said cavitation system;
a cavitation chamber, wherein said cavitation chamber has a first mode of
operation and a second mode of operation, wherein said cavitation chamber is coupled to said circulatory system in said first mode of operation and wherein said cavitation chamber is isolated from said circulatory system in said second mode of operation;
means for degassing said cavitation fluid; and
a hydraulic actuated cavitation driver coupled to said cavitation chamber for driving cavitation within said cavitation chamber when said cavitation chamber is in said second mode of operation, said hydraulic actuated cavitation driver configured to form cavities within said cavitation fluid within said cavitation chamber when cycled in a first direction and implode said cavities within said cavitation fluid within said cavitation chamber when cycled in a second direction, said hydraulic actuated cavitation driver comprising:
a cavitation drive piston having a piston head positioned within an inlet of said cavitation chamber;
a hydraulic cylinder containing a hydraulic piston, said hydraulic piston coupled to said cavitation drive piston;
actuating valves coupled to said hydraulic cylinder;
a pump coupled to said actuating valves; and
a hydraulic fluid reservoir coupled to said pump and said actuating valves.

2. The cavitation system of claim 1, further comprising a coupling sleeve interposed between said cavitation chamber and said hydraulic cylinder, wherein said coupling sleeve houses a piston rod coupling said cavitation drive piston to said hydraulic piston.

3. The cavitation system of claim 2, further comprising a vacuum pump coupled to said coupling sleeve, wherein said coupling sleeve is configured to allow evacuation.

4. The cavitation system of claim 1, further comprising an accumulator coupled to said pump and said actuating valves.

5. The cavitation system of claim 1, wherein said cavitation chamber is spherical.

6. The cavitation system of claim 1, wherein said cavitation chamber is cylindrical.

7. The cavitation system of claim 1, wherein said degassing means further comprises a degassing chamber coupled to said circulatory system.

8. The cavitation system of claim 7, wherein said degassing means further comprises a vacuum pump coupled to said degassing chamber.

9. The cavitation system of claim 8, wherein said degassing means further comprises at least one acoustic cavitation driver coupled to said degassing chamber.

10. The cavitation system of claim 1, wherein said degassing means further comprises a vacuum pump coupled to said cavitation chamber.

11. The cavitation system of claim 10, wherein said degassing means further comprises at least one acoustic cavitation driver coupled to said cavitation chamber.

12. A cavitation system comprising:
a cavitation fluid degassing system for degassing cavitation fluid;
a cavitation chamber separate from said cavitation fluid degassing system, wherein said cavitation chamber has a first mode of operation and a second mode of operation, wherein said cavitation chamber is coupled to said cavitation fluid degassing system in said first mode of operation and wherein said cavitation chamber is isolated from said cavitation fluid degassing system in said second mode of operation; and a hydraulic actuated cavitation driver coupled to said cavitation chamber for driving cavitation within said cavitation chamber when said cavitation chamber is in said second mode of operation, said hydraulic actuated cavitation driver configured to form cavities within said cavitation fluid within said cavitation chamber when cycled in a first direction and implode said cavities within said cavitation fluid within said cavitation chamber when cycled in a second direction, said hydraulic actuated cavitation driver comprising:

a cavitation drive piston having a piston head positioned within an inlet of said cavitation chamber;

a hydraulic cylinder containing a hydraulic piston, said hydraulic piston coupled to said cavitation drive piston; actuating valves coupled to said hydraulic cylinder;

a pump coupled to said actuating valves; and a hydraulic fluid reservoir coupled to said pump and said actuating valves.

13. The cavitation system of claim 12, further comprising a coupling sleeve interposed between said cavitation chamber and said hydraulic cylinder, wherein said coupling sleeve houses a piston rod coupling said cavitation drive piston to said hydraulic piston.

14. The cavitation system of claim 13, further comprising a vacuum pump coupled to said coupling sleeve, wherein said coupling sleeve is configured to allow evacuation.

15. The cavitation system of claim 12, further comprising an accumulator coupled to said pump and said actuating valves.

16. The cavitation system of claim 12, wherein said cavitation chamber is spherical.

17. The cavitation system of claim 12, wherein said cavitation chamber is cylindrical.

18. The cavitation system of claim 12, wherein said cavitation fluid degassing system further comprises a degassing chamber.

19. The cavitation system of claim 18, wherein said cavitation fluid degassing system further comprises a vacuum pump coupled to said degassing chamber.

20. The cavitation system of claim 19, wherein said cavitation fluid degassing system further comprises at least one acoustic cavitation driver coupled to said degassing chamber.

* * * * *